Feb. 27, 1940.　　　　E. DUNFORD　　　　2,191,984
BEARING MOUNTING
Filed Jan. 12, 1938　　　　2 Sheets-Sheet 1

INVENTOR
Ernest Dunford
BY Rodney Bedell
ATTORNEY

Feb. 27, 1940.   E. DUNFORD   2,191,984
BEARING MOUNTING
Filed Jan. 12, 1938   2 Sheets-Sheet 2

INVENTOR
Ernest Dunford
BY Rodney Bedell
ATTORNEY

Patented Feb. 27, 1940

2,191,984

UNITED STATES PATENT OFFICE 2,191,984

BEARING MOUNTING

Ernest Dunford, St. Louis, Mo., assignor to Landis Machine Company, St. Louis, Mo., a corporation of Missouri Application January 12, 1938, Serial No. 184,539

15 Claims. (Cl. 308—236)

The invention relates to the mounting of bearing structures upon shafts with which they cooperate either to support the shaft or to support a relatively rotating part on the shaft.

The invention is adapted particularly for the mounting of anti-friction bearing units which may be manufactured and sold independently of the shafts to which they are applied. When such an anti-friction unit is used in a machine, the outer race should be secured against rotation while the inner race must be secured to the shaft upon which it is mounted so that there is no relative rotation between the shaft and the inner race but all the rotation is confined strictly within the anti-friction bearing. Also the anti-friction unit may be utilized as an end thrust device to prevent play of the shaft lengthwise of its axis. It is essential, therefore, that the inner race be fixed to the shaft so positively that repeated thrusts in opposite directions do not loosen the anchorage. It is important also that no machining of the shaft or the unit be required.

Sometimes the bearing element must be mounted at a point on a shaft spaced a substantial distance from the end of a shaft, and in such cases it is impossible to use an ordinary drive fit even if the shaft and bearing are accurately machined for each other.

Various methods have been suggested for securing a bearing member such as, for example, the inner race of a ball bearing unit, to a shaft so as to meet the above conditions. Likely the simplest is the use of a set screw threaded into the bearing member and engaging the shaft. Other methods include the use of a split bearing member and means for contracting the same into tight engagement with the shaft by nuts threaded over the same, or by eccentric or other cam-like surfaces actuated by relative rotation of the nut and the bearing.

Where a set screw is used, the surface of the shaft is marred necessarily and there is a tendency to distort the bearing from a true circular surface because of the thrust of the screw against the bearing as well as against the shaft. If a split bearing is used, the bearing surface is not continuous, which is objectionable obviously. Cam-like interengaging elements are likely to be expensive in construction, and devices secured by relative rotation of the parts are subject to loosening due to unintentional relative movement of the bearing and shaft in the direction opposite to that which tightens the assembly.

The main object of the present invention is to provide a simple, economical, secure assembly of a shaft and bearing which is free of the above-mentioned disadvantages particularly in that it can be readily completed without machining the parts at the place and time of assembly, and without distorting the shaft or the bearing.

Other objects incidental to the structure will appear from the following description and inspection of the accompanying drawings, in which—

Figures 1, 2:
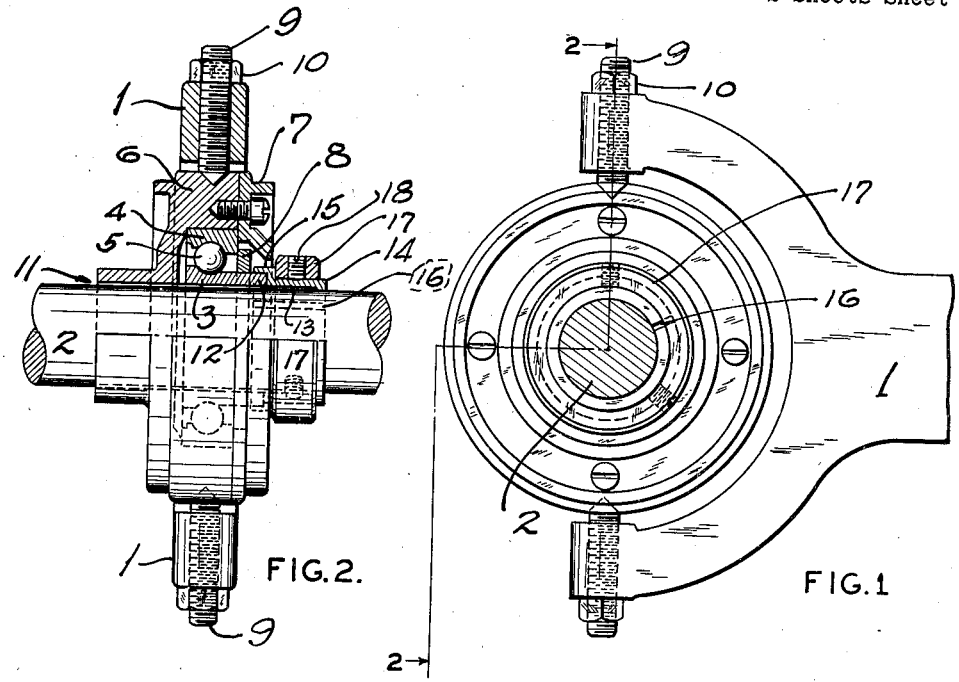
Figure 1 is an elevation of a portion of a machine frame with a shaft and a shaft supporting bearing mounted therein.
Figure 2 is a vertical section taken on the line 2—2 of Figure 1.
Figures 3, 4:
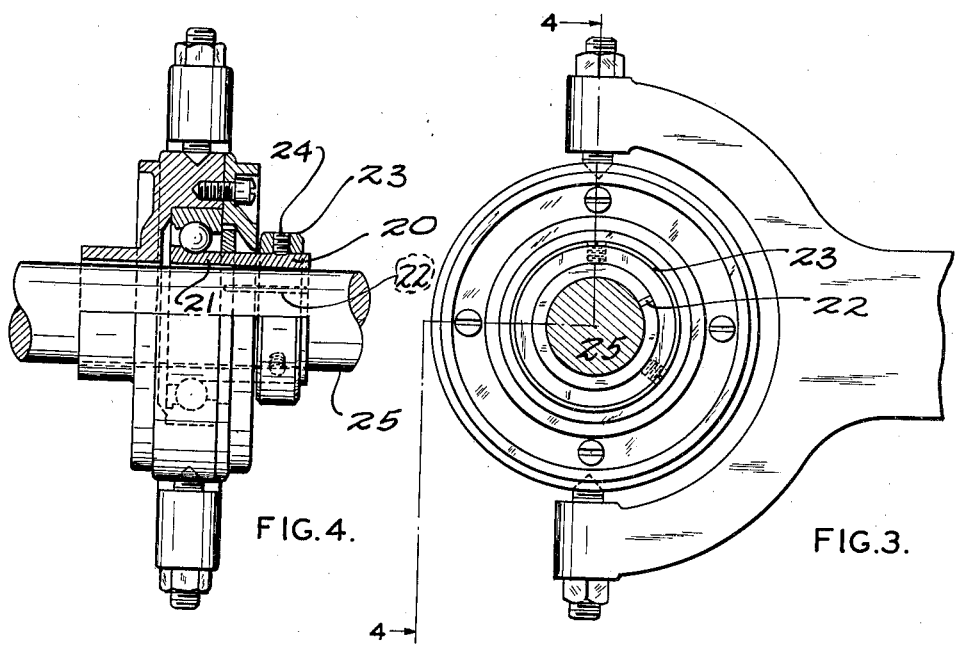

Figure 3 corresponds to Figure 1 but illustrates a modified form of the invention.

Figure 4 corresponds to Figure 2 but illustrates a modification and is taken on the line 4—4 of Figure 3.

Figures 5, 6:
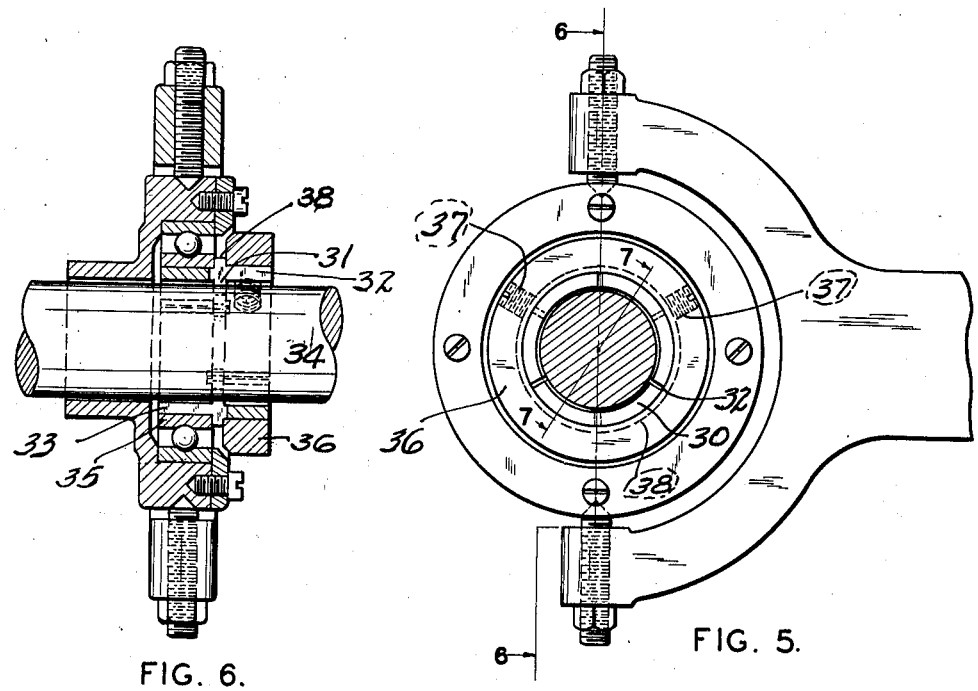

Figures 5 and 6 correspond to Figures 1 and 2 but illustrate another modification of the invention.

Figure 7:
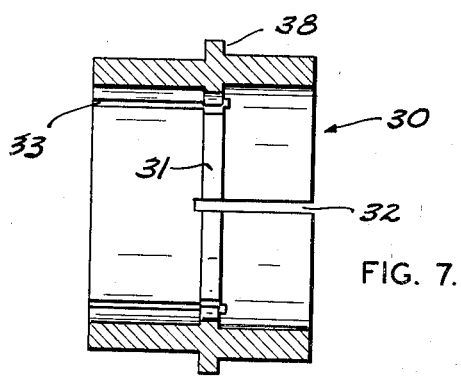

Figure 7 is a detail section through the sleeve member shown in Figures 5 and 6.

The frame member 1 may be a bracket on a frame such, for example, as one of the several spaced apart brackets on a shoe finisher in which the shaft 2 carries a number of devices such as buffing wheels, burnishers, sanding wheels, trimmers, etc. The shaft is supported in the frame by ball bearing units each comprising an inner race 3, secured to the shaft, an outer race 4 secured to the frame, balls 5 between the races, and a housing comprising a body portion 6 and a removable retainer portion 7. The device may also include a lubricant retainer 8, a ball cage (not shown), and other elements. Screws 9 with lock nuts 10 serve to adjust the bearing and shaft in the frame transversely of the shaft axis and permit swiveling of the bearing unit to accommodate variations in the angle between the shaft axis and the frame.

Preferably the unit members 3 and 6 surround the shaft with sufficient clearance so that they may be applied to the shaft without machining the shaft or the members and without any distortion of the members due to any unevenness of the surface of the shaft. The space indicated at 11 is exaggerated for the purpose of indicating the clearance referred to. Ordinarily the clearance would be too slight to be clearly perceptible in a drawing of this type.

It will be understood that races 3 and 4 are rigid and continuous so that a true track with an unbroken surface is provided for the balls.

Inner race 3 extends for a substantial distance from the right of the ball track and projects beyond the face of retainer 8 and this projecting portion is also rigid and has a continuous periphery.

A sleeve 13 receives shaft 2 and has an inturned lip 14 at its outer end engaging the shaft, and at its inner end has an outwardly offset rim 15 surrounding the corresponding end 12 of race 3. Sleeve 13 is split at 16 so it is readily contractable about the shaft and the bearing race.

A rigid collar 17 surrounds the periphery of sleeve 13 and is threaded for one or more screws 18 disposed radially of the collar, intermediate lip 14 and shoulder 15, and comprising means for contracting the sleeve about the shaft and the bearing race.

Sleeve 13, collar 17, and screws 18 provide a simple, effective device for "anchoring" the ball race to the shaft and meeting the conditions referred to above as detracting from other methods for securing the bearing in place. The relation between the inner diameter of the body of the sleeve and the inner diameters of lip 14 and rim 15 is such that when the lip is clamped against the shaft and the rim is clamped against the race portion 12, there will still be clearance between the shaft and the adjacent portion of the body of the sleeve. Hence when screws 18, located intermediate the ends of the sleeves, are tightened, both ends of the sleeve will contract, independently of each other, providing a secure grip on the shaft and the race. The gripping pressure will be distributed substantially evenly about the periphery of the race and the shaft, avoiding any distortion of the former and any marring of the latter. The bearing attaching means may be loosened and shifted longitudinally of the shaft to a different position without difficulty.

The structure illustrated in Figures 3 and 4 corresponds in most of its features to that shown in Figures 1 and 2 but the separate contracting split sleeve is omitted and in place thereof the laterally extending portion 20 of the inner race 21 is continued a substantially greater distance from the ball track than is indicated in the previous form of the invention, and this part only of the race is split as indicated at 22. A rigid collar 23 fits over the contractable portion 20 of the inner race and is provided with radial screws 24 whereby the portion 20 may be contracted to grip the same and the shaft without contracting the track-forming portion of the race and without distorting the latter or marring the surface of the shaft 25.

Figures 5, 6 and 7 illustrate another arrangement for anchoring the bearing member to the shaft by use of a rigid collar encircling the shaft. In this form of the invention a sleeve 30 loosely surrounds the shaft and includes an inner peripheral rib 31 of slightly smaller diameter than the body of the sleeve. The sleeve is slotted inwardly from each end as indicated at 32 and 33, each of the slots extending a short distance beyond rib 31. The sleeve is placed over the shaft 34 and the rigid inner race 35 of the anti-friction element is slipped over the left hand split portion of the sleeve and the rigid collar 36 is slipped over the right hand portion of the split sleeve. An external peripheral rib 38 serves as an abutment positioning elements 35 and 36.

When the screws 37 are tightened against the right hand portion of sleeve 30, the latter will move radially inwardly and rib 31 will be contracted to grip shaft 34 and will serve as a fulcrum whereby further contraction of the right hand portion of the sleeve by the screws will cause the left hand portion of the sleeve to move radially outwardly to grip the inner periphery of race 35.

The grip on the shaft and the grip on the bearing will be substantially uniform throughout the periphery of the sleeve, thereby avoiding any uneven distortion of the parts.

While the structures described are particularly effective for securing an anti-friction race to a shaft, it is practical to similarly mount an ordinary bearing member on a shaft, and it will be understood that the details of the bearings and of the mounting of the same in the machine frame, other than the feature of the bearing anchorage to the shaft, are not essential to the invention as described in the accompanying claims, and the exclusive use of any modifications in the structures as described and illustrated coming within the scope of the claims is contemplated.

I claim:

1. In combination with a shaft, a contractable sleeve surrounding said shaft and including a portion with an inner periphery paralleling the periphery of said shaft and spaced therefrom, a rigid collar surrounding said sleeve, means movably mounted on said collar to contract said sleeve to grip said shaft, and a rigid race for an anti-friction device surrounding said shaft and having a portion gripped by said sleeve portion as said sleeve is contracted by said means.

2. In combination with a shaft, an anti-friction bearing rigid inner race loosely receiving the shaft and including a track for anti-friction elements, and having a portion projecting parallel to the axis of the race substantially beyond said track, a split sleeve adapted, when contracted, to tightly grip the shaft and said race portion at points spaced longitudinally of said sleeve, a rigid collar surrounding said sleeve, and means movably mounted on said collar for contracting said sleeve.

3. In combination with a shaft, a rigid race loosely receiving said shaft and providing a rigid track for anti-friction elements, a portion on said race extending along said shaft a substantial distance from said track, a split sleeve having one end surrounding and contacting with said race portion and having its other end surrounding and contacting with said shaft, a rigid collar surrounding said sleeve, and one or more screws disposed radially of said shaft and sleeve and collar and threaded into the latter with their inner ends bearing on said sleeve to contract the latter and tighten the same on said shaft and race portion.

4. In a device of the class described, an inner race, said inner race being rigid and providing a continuous track for anti-friction elements, a contractable sleeve having a shouldered interior periphery with its outwardly offset portion receiving the exterior of a part of said inner race and with its inwardly offset portion being of smaller diameter than the inner periphery of said inner race, a rigid collar surrounding said sleeve, and means movably mounted thereon for contracting said sleeve.

5. In a device of the class described, an anti-friction unit including a race for loosely receiving a shaft to which the unit is to be applied, a split cylindrical sleeve which, when contracted, has its inner periphery at one end of a diameter to engage the exterior of said race and at its other end of a diameter to engage the exterior of said shaft and intermediate said ends of a diameter to clear said shaft, and means intermediate the ends of said sleeve for contracting the same.

6. In a device of the class described, an anti-friction unit including a race for loosely receiving a shaft to which the unit is to be applied, a split cylindrical sleeve having its inner periphery offset outwardly at one end to fit around an end portion of said race and offset inwardly at the other end to engage said shaft, and means intermediate the ends of said sleeve for contracting the same.

7. In combination with a shaft, a rigid part arranged to slide over said shaft and having a continuous-bearing exterior surface, a cylindrical member surrounding one end portion of said part and extending outwardly therefrom along said shaft, said member being split lengthwise and contractable about said shaft and part, a rigid collar slidable over said member, and one or more screws threaded into said collar and disposed radially thereof with their inner ends engaging said member intermediate its ends to contract said member and clamp it about said shaft and part.

8. In combination with a shaft, a rigid ring arranged to receive said shaft and having a continuous bearing-forming surface, a contractable member surrounding said shaft and ring, and a rigid collar surrounding said member, there being radially movable elements in said collar for contracting said member about said shaft and ring.

9. In combination with a shaft, a sleeve-like member arranged to loosely surround the shaft and having an inner peripheral element intermediate its ends disposed to bear on said shaft, said member being split longitudinally from said element towards each end, a rigid part surrounding said member at one side of said element and having a continuous bearing-forming exterior periphery, a rigid collar surrounding said member at the other side of said element, said collar being provided with means for contracting the corresponding portion of said member to grip said shaft and to expand said member at the opposite side of said element to grip the interior of said part and thereby anchor said part to said shaft.

10. In a device of the class described, a sleeve-like member having an internal peripheral rib between its ends, said member having a plurality of longitudinal slots extending inwardly from each end and a relatively short distance past said rib, the slots leading inwardly from one end of said member being staggered with the slots leading inwardly from the other end of said sleeve, a rigid part with an interior periphery closely surrounding said sleeve adjacent one end and adapted to be engaged thereby and having an exterior periphery forming a bearing, and a rigid part surrounding said sleeve adjacent the other end and provided with radially movable elements for contracting the corresponding slotted portion of said sleeve.

11. In a device of the class described, a rigid ring arranged to loosely receive a shaft to which the device is applied and including a continuous periphery forming an inner race, a sleeve surrounding a portion of said inner race and arranged to receive said shaft, said sleeve being contractible about said race and shaft, and means surrounding said sleeve operable without access to said inner race for contracting said sleeve.

12. In a device of the class described, a rigid ring arranged to loosely receive a shaft to which the device is applied and including a continuous periphery forming an inner race, a housing having a cylindrical portion for receiving and closely surrounding said shaft and opening laterally to receive a closure detachably secured to the open side of said housing, a lubricant retainer within said closure and sealing the race, a radially contractible sleeve inclosing the outer edge of said race and adapted to receive said shaft, a rigid collar surrounding said sleeve, and means on said collar for tightening said sleeve on said race and shaft without moving said race and sleeve circumferentially of each other.

13. In combination with a shaft, a rigid ring loosely surrounding said shaft and having a continuous race-forming exterior surface, a rigid collar loosely surrounding said shaft, said ring and collar being spaced apart, a member adjacent to but formed separately from said ring and collar and surrounding said shaft and having elements movable radially independently of movement axially of the shaft to contact peripheral surfaces on said ring and shaft, and means on said collar operable manually and independently of said ring to move said elements radially to grip said shaft and ring and prevent their relative movement.

14. In an anti-friction bearing mounting device of the class described, a rigid ring arranged to loosely surround a shaft to which the device is applied, said ring having a continuous exterior periphery forming a race for anti-friction bearings, a rigid collar spaced from said ring and arranged to loosely surround the shaft, an annular member expansible and contractible radially independently of movement axially of the shaft and having peripheral surfaces spaced apart and respectively engaging said ring and being adapted to engage the shaft, and means movably mounted on said collar and operable manually independently of said ring to actuate said member to thrust said surfaces against said ring and shaft to prevent their relative movement.

15. In an anti-friction bearing mounting device of the class described, a rigid ring arranged to loosely surround a shaft to which the device is applied, said ring having a continuous exterior periphery forming a race for anti-friction bearings, a rigid collar spaced from said ring and having one or more screws threaded therethrough radially, and a split sleeve having portions expansible and contractible radially independently of movement axially of the shaft and movable by said screws independently of said ring to grip the latter and the shaft and hold them against relative movement.

ERNEST DUNFORD.